(12) United States Patent
Isaacson et al.

(10) Patent No.: US 8,914,481 B2
(45) Date of Patent: Dec. 16, 2014

(54) SPONTANEOUS RESOURCE MANAGEMENT

(75) Inventors: Scott Alan Isaacson, Woodland Hills, UT (US); Stephen R Carter, Spanish Fork, UT (US); Tammy Anita Green, Provo, UT (US)

(73) Assignee: Novell, Inc., Provo, UT (US)

( * ) Notice: Subject to any disclaimer, the term of this patent is extended or adjusted under 35 U.S.C. 154(b) by 599 days.

(21) Appl. No.: 12/258,181

(22) Filed: Oct. 24, 2008

(65) Prior Publication Data

US 2010/0106834 A1 Apr. 29, 2010

(51) Int. Cl.
G06F 15/173 (2006.01)
G06F 15/16 (2006.01)
H04L 12/24 (2006.01)

(52) U.S. Cl.
CPC ............ H04L 41/50 (2013.01); *H04L 41/0213* (2013.01); *H04L 41/0893* (2013.01)
USPC ........................... 709/223; 709/218; 709/226

(58) Field of Classification Search
USPC .................................................. 709/220–226
See application file for complete search history.

(56) References Cited

U.S. PATENT DOCUMENTS

| | | | |
|---|---|---|---|
| 5,857,195 A | 1/1999 | Hayashi et al. | |
| 6,625,643 B1 * | 9/2003 | Colby et al. | 709/217 |
| 6,990,440 B1 | 1/2006 | Sroka | |
| 7,433,945 B2 | 10/2008 | Ng et al. | |
| 7,886,033 B2 * | 2/2011 | Hopmann et al. | 709/223 |
| 2002/0184357 A1 * | 12/2002 | Traversat et al. | 709/223 |
| 2003/0023712 A1 * | 1/2003 | Zhao et al. | 709/223 |
| 2004/0111315 A1 * | 6/2004 | Sharma et al. | 705/11 |
| 2005/0015471 A1 * | 1/2005 | Zhang et al. | 709/221 |
| 2005/0050225 A1 * | 3/2005 | Tatman | 709/244 |
| 2005/0289110 A1 * | 12/2005 | Giampaolo et al. | 707/1 |
| 2006/0041660 A1 * | 2/2006 | Bishop et al. | 709/224 |
| 2006/0246879 A1 * | 11/2006 | Miller et al. | 455/414.1 |
| 2007/0088814 A1 * | 4/2007 | Torii | 709/223 |
| 2007/0214097 A1 * | 9/2007 | Parsons et al. | 706/12 |
| 2008/0013566 A1 | 1/2008 | Smith | |
| 2008/0056269 A1 * | 3/2008 | Madhani et al. | 370/395.2 |
| 2008/0083031 A1 * | 4/2008 | Meijer et al. | 726/22 |
| 2008/0133747 A1 | 6/2008 | Fish | |
| 2008/0147487 A1 * | 6/2008 | Hirshberg | 705/10 |
| 2011/0022602 A1 * | 1/2011 | Luo et al. | 707/748 |

* cited by examiner

*Primary Examiner* — Yasin Barqadle

(74) *Attorney, Agent, or Firm* — Schwegman Lundberg & Woessner, P.A.

(57) ABSTRACT

Techniques for spontaneous resource management are provided. Information about resources is indexed and housed in a repository. The information is dynamically updated. Search queries are performed against the indexed information in the repository for purposes of forming dynamic groupings of the resources that are then managed as custom-defined and dynamic groups.

7 Claims, 3 Drawing Sheets

SPONTANEOUS RESOURCE MANAGEMENT

BACKGROUND

Most business, educational, community, and government organizations rely on computer systems to support their business processes. These computer systems have to be deployed and managed by sizable support personnel. Additionally, many organizations require more than one computer system, which is often deployed as a suite and which generally acts in a coordinated manner to realize complex business processes and transactions. These distributed systems are contained within protected zones and bounded within firewalls and access points. But, within the protected zones there is often open communication and cooperation between various managed systems and the services that they host.

The managed systems are often discrete and are capable of acting in concert with other services for providing higher-level composite services. Also, these systems are of various hardware architectures and operating systems, which operate within heterogeneous environments and which offer individual services on presumably the most efficient, reliable, or cost effective architectural platforms.

However, there are few organizations that act/operate with one mind from the top down. Likewise, an organization's managed system may often include many isolated data centers and workgroup productivity centers deployed as duplicate and redundant servers and services. This is done by the enterprise, without really knowing what is already available. In some cases, a new server needs to be deployed having a certain version of an operating system, which supports a unique application and that can only run on a particular device; but, again, the application acts in a coordinated manner with other services that are deployed within the organization.

For example, take a real world scenario of a customer and partner-facing World-Wide Web (WWW) portal for a given enterprise. This would likely need the following components:
Web server(s)
Authentication server(s)
Middle-tier application server(s)
Database server(s)
And other such components.

These n-tier systems are well understood within the industry, but require real systems to deploy them. In this example, perhaps the fastest performing web server is an Apache running on an openSUSE Linux server, and the best authentication server is Novell eDirectory® running on a NetWare® 6.5 server and the best middle tier application server is some custom application running on Novell SLES 10 and the database server is an Oracle® database running on Solaris® on a Sun® server. Each of these servers is based on hardware that is different from the others in many respects. Some processors are IA32 or IA64 and some are SPARC®. Some Operating Systems (OS's) are closed source and proprietary, while some are open source. A certain department within the organization decides to deploy these servers and services, but they must be maintained and supported and so the organization hires a variety of qualified staff to monitor these servers and services. The hired systems managers often use proprietary, open source, and open standards-based tools such as OpenView, DMTF CIMOM, SNMP, iManager, YaST, command line tools, scripts, and/or other tools to monitor and manage the servers and services.

Problems arise when not just one department within an enterprise deploys these various servers and services, but when multiple departments within the same enterprise do the same thing as one another. When this happens, there are two web servers, two database servers, two authentication services. Many solutions exist today to synchronize data between these systems, but a problem still remains when multiple Information Technology (IT) staff and resources are assigned to manage servers and services that perhaps should and probably could be consolidated together.

Another issue is when a systems manager locates various servers and services (IP address, LAN subnet, URL, port, or other location/identification mechanism) and then groups them into management groups that make sense to that system administrator, but perhaps does not make sense to another systems administrator from another department.

Thus, improved techniques for system management are needed.

SUMMARY

In various embodiments, techniques for spontaneous resource management are provided. More specifically, and in an embodiment, a method is provided for dynamic resource management. Broadcast messages are regularly received from managed services of an enterprise over a network. The broadcast messages are indexed in a repository. A management tool subsequently permits searches to be executed against the repository for purposes of selectively identifying particular ones of the managed services that collectively form a managed group of services that the management tool dynamically manages.

DETAILED DESCRIPTION

A "resource" includes a user, content, a processing device, a node, a service, an application, a system, a directory, a data store, groups of users, combinations of these things, etc. Resources can interact with each other and can either act on other resource or be acted upon by other resources. The term "service" and "application" may be used interchangeably herein and refer to a type of software resource that includes instructions, which when executed by a machine performs operations that change the state of the machine and that may produce output.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The phrases "managed resource," "managed service," and "managed system" may be used interchangeably and synonymously herein and below. These are special resources that are managed and monitored by a network administrator. These can include such things as servers, proxies, storage devices, email services, etc. The resources that are managed are dispersed over a network, such as the Internet and/or an enterprise Intranet, etc.

As will be explained in greater detail herein and below, the managed resources are dynamic such that they change and evolve in real time as conditions change with them on the network. In a sense, the resources self-populate dynamically defined managed resource groups and add and remove themselves from groups as circumstances warrant.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
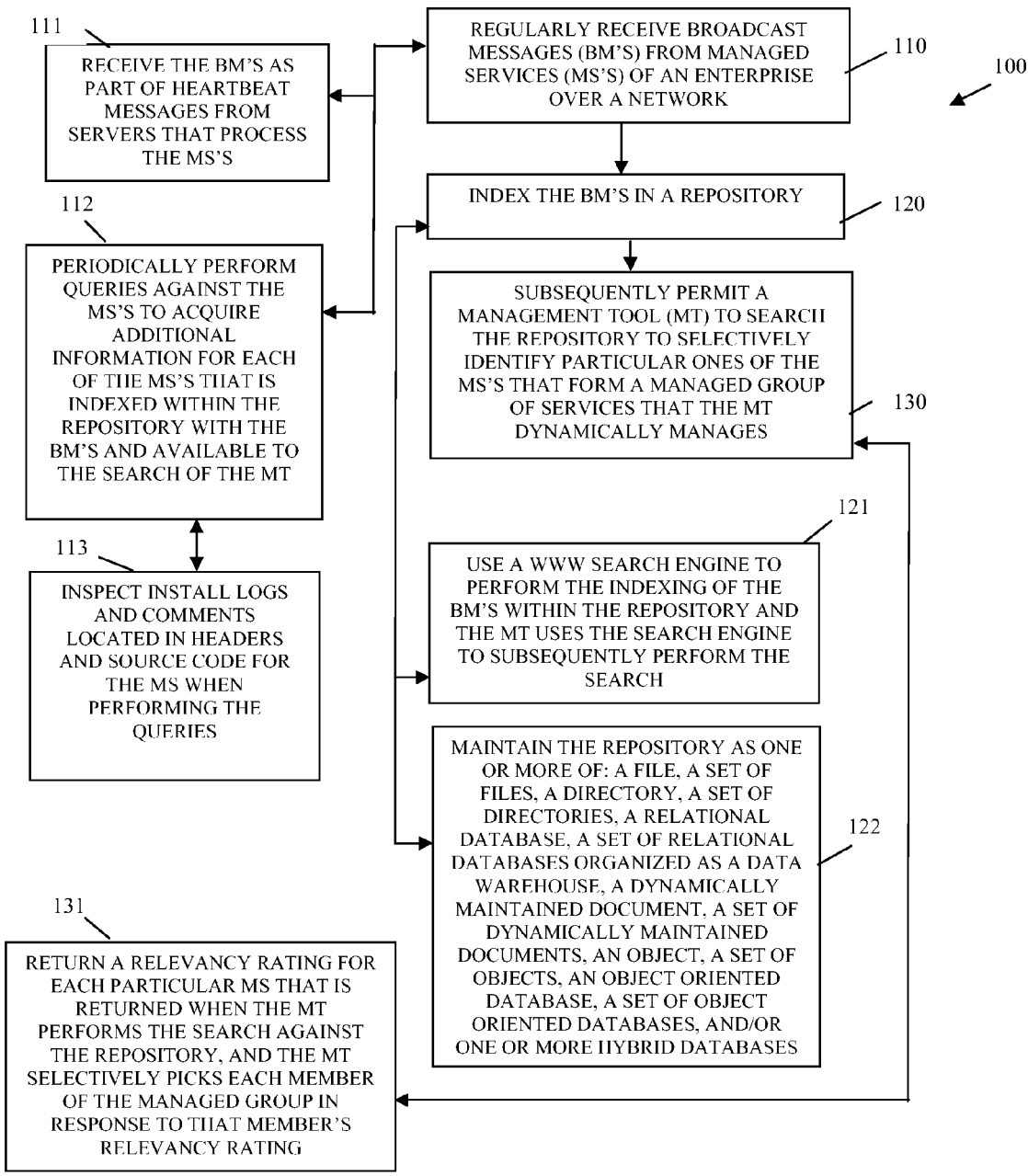
FIG. 1 is a diagram of a method for dynamic resource management, according to an example embodiment.

FIG. 1 is a diagram of a method 100 for spontaneous resource management, according to an example embodiment. The method 100 (hereinafter "information collection service") is implemented as instructions in a machine-accessible and computer-readable storage medium. The instructions when executed by a machine (computer or processor-enabled device) perform the processing depicted in FIG. 1. The information collection service is also operational over and processes within a network. The network may be wired, wireless, or a combination of wired and wireless.

At 110, the information collection service regularly receives broadcast messages from managed services or an enterprise over the network.

The broadcast messages can include a variety of information, such as standards being used with the managed services (Distributed Management Task Force (DMTF), Common Information Manager Object Model (CIMOM), Simple Network Management Protocol (SNMP), etc.).

The broadcast messages can also indicate who the managed services are and what they are doing. For example, I am IA32 Intel® 586 server that is loaded with openSUSE® 10.3 and I am running Apache 2.1.2 on ports 80 and 443.

According to an embodiment, at 111, the information collection service receives the broadcast messages as part of a heartbeat message from servers that process the managed services. In other words, in a highly-available enterprise configuration, the servers may periodically broadcast heartbeat messages indicating that they are up and running to the other remaining servers. In this case, the broadcast messages can be part of that heartbeat message.

The information collection service collects the broadcast messages. In some cases, all the information that is advertised by the managed services is contained in the broadcast messages. In another case, at 112, the information collection service periodically performs queries against the managed services and/or their processing environments to acquire additional information for each of the managed services. This additional information is also indexed within the repository with the broadcast messages (discussed below) and made available to the searches of a management tool (also discussed below).

Continuing with the embodiment of 112 and at 113, the information collection service can be configured to inspect install logs and comments located in headers and source code associated with each of the managed services when the queries are performed. So, the information collection service targets specific files, directories, and/or metadata within the processing environments of the managed services to collect the additional information.

In some cases, an entire file, document and/or comments from the processing environment or managed service are grabbed by the information collection service and no real query is performed at all; rather, the whole text version of these entities are used as the additional information. So, free-form text as inputted by personnel associated with the managed services can be captured in its unadulterated format, such as a note from an administrative person that the person made to himself or herself, install read me files, etc.

The information captured by the information collection service can be viewed as similar to a blog or social networking site, but the information is related to a managed resource and not a person (as would be the case with a blog or social networking site). The information is not modified and is retained by the information collection service.

At 120, the information collection service indexes the broadcast messages in a repository that is managed by the information collection service.

In an embodiment, at 121, the information collection service uses a World-Wide Web (WWW) search engine, such as Google®, for performing the indexing within the repository. A management tool (discussed below) subsequently uses the search engine to perform a search of the repository (also discussed below).

In an embodiment, at 122, the information collection service maintains the repository as one or more of the following: a file, a set of files, a directory, a set of directories, a relational database, a set of relational databases organized as a data warehouse, a dynamically maintained document, a set of dynamically maintained documents, an object, a set of objects, an object-oriented database, a set of object-oriented databases, and/or one or more hybrid databases.

At 130, the information collection service subsequently permits a management tool to search the repository for purposes of selectively identifying particular ones of the managed services to form a managed group of services that the management tool dynamically manages. In other words, the management tool searches the repository that this provided and managed by the information collection service to identify particular managed resources. These managed resources are organized as a self-managed group and presented as a logical entity within the management tool for the management tool to monitor and manage. The search can be custom defined, predefined, previously saved, ad hoc, etc.

It is noted that members (services) of the managed group can dynamically change, such that new members are added and/or existing members are deleted from the managed group. This can occur via periodically executing the search. In another case, the search is registered with the information collection service and when the information collection service detects an addition or deletion the management tool is automatically notified via a change in the membership of the managed group. So, members can chaotically change within the managed group.

In an embodiment, at 131, the information collection service also returns a relevancy rating for each particular managed service. This is done when the management tool performs the search against the repository. The management tool can then selectively pick each member of the managed group in response to the relevancy rating. For example, consider a search of the repository that uses Google®, a percentage for relevancy can be automatically provided. Policies can also be used such that when a relevancy rating exceeds a threshold value (e.g., 80%) the managed service associated with the result is automatically added to the managed group.

So, the search can result in automatic managed group population or can result in a semi or partially populated group that can be completely populated by an administrator that interacts with the management tool and views the results from the search. The information that is stored in the repository is associated with particular managed services. The answer set returned with the search can include links to the full content associated with a match in its native location on a particular managed service or in a copy of the full content maintained within the repository.

It is now appreciated how information regarding managed services is collected much like a social networking blog. This information is indexed and made searchable so that network administrators via a management tool can dynamically create on-the-fly and in real-time managed groupings for selective ones of the managed services. As conditions for services change so may their membership within a managed group, these changed conditions can be automatically and dynamically detected in real time, such that the managed groupings are ever evolving. This is a substantial improvement over the traditional static nature of managed groups that network administrators are relegated to managing with conventional tools.

Figure 2:
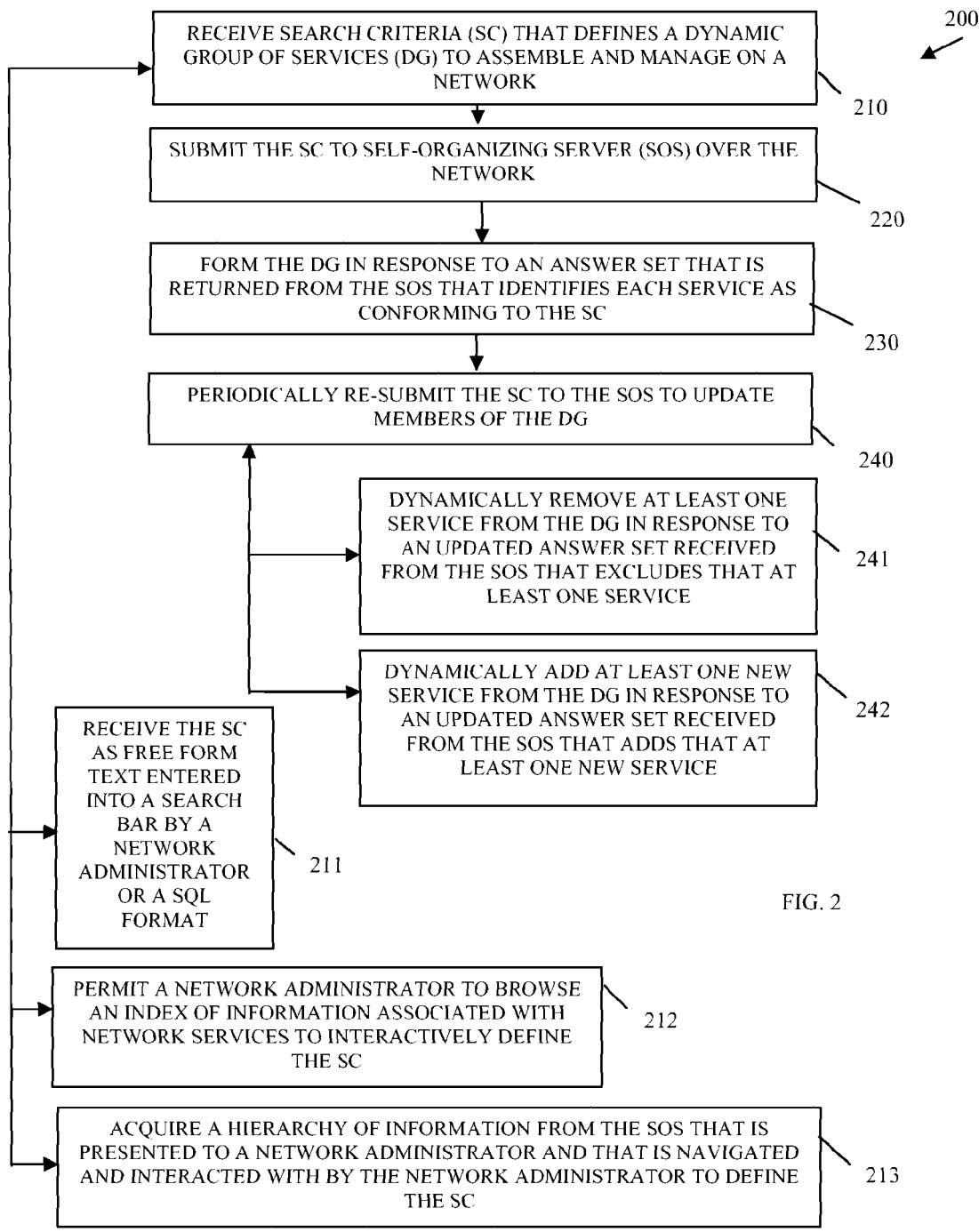
FIG. 2 is a diagram of another method for spontaneous resource management, according to an example embodiment.

FIG. 2 is a diagram of another method 200 for spontaneous resource management, according to an example embodiment. The method 200 (hereinafter "resource manager" is implemented in a machine-accessible and readable medium as instructions. The instructions when executed by a machine perform the processing depicted in the FIG. 2. Moreover, the resource manager is operational over a network, and the network may be wired, wireless, or a combination of wired and wireless.

The resource manager presents a perspective of dynamic resource management from an administrator's client device whereas the information collection service (represented by the method 100 of the FIG. 1) presented the perspective of a repository that dynamically collects information about managed resources. So, the resource manager interacts with the information collection service to dynamically define and manage resources.

At 210, the resource manager receives search criteria (custom, ad hoc, previously saved, etc.). The search criteria define a dynamic group of services that are to assemble or to be assembled and managed/monitored on the network.

According to an embodiment, at 211, the resource manager receives the search criteria as free form text that is entered into a search bar of a management tool interface by a network administrator. In this embodiment, the resource manager is the management tool and provides the search bar or menu option to the network administrator. In another case, the search criteria can be entered as a Structured Query Language (SQL) format by the network administrator.

In another case, at 212, the resource manager permits a network administrator to browse an index of information associated with network services for purposes of interactively defining the search criteria.

In another situation, at 213, the resource manager acquires a hierarchy of information from a self-organizing server. The hierarchy is presented to the network administrator and the network administrator can navigate and interact with the hierarchy for purposes of defining the search criteria. So, different views of the information about the networked services can be maintained at the self-organizing server and the network administrator can navigate and view that information via categories, topics, classifications, etc.

At 220, the resource manager submits the search criteria to a self-organizing server over the network. Example processing associated with the self-organizing server was presented above with reference to the method 100 of the FIG. 1.

At 230, the resource manager forms the dynamic group in response to an answer set that is returned from the self-organizing server that identifies each service as conforming to the search criteria. That is, the search defining the search criteria when executed by the self-organizing server reveals an answer set. That answer set includes the identities of particular managed services and those particular managed services form the dynamic group that is to be managed over the network.

According to an embodiment, at 240, the resource manager periodically re-submits the search criteria to the self-organizing server to dynamically update members of the dynamic group. A policy may indicate how frequently the search is re-submitted. Alternatively, when a member of the managed group broadcast is different or has changed information, this can be compared to the search criteria (via the self-organizing server) and the dynamic group of services automatically updated as needed.

Continuing with the embodiment at 240 and at 241, the resource manager dynamically removes at least one service from the dynamic group in response to an updated answer set received from the self-organizing server. The updated answer set excludes that particular service such that when compared to the previous answer set it is noted that the particular service is being dynamically removed.

Also continuing with the embodiment at 240 and at 242, the resource manager dynamically adds at least one new service from the dynamic group of services in response to an updated answer set received from the self-organizing server. Again, the updated answer set reveals an addition of the particular service when compared to the previous answer set.

The dynamic group is updated as conditions change on the network. So, should a particular service change its processing environment or configuration such that it is now not considered a member of the managed group in view of the defined search criteria, then the particular service is automatically and dynamically removed from the managed group.

Consider the following example illustrations of how the resource manager and the self-organizing server (method 100 of FIG. 1) can be used in a few scenarios. A network administrator interacts with the resource manager to define some search criteria that is provided to the self-organizing server. The search criteria define a new group or relationship between some managed servers/services. The group is not a static one time effort, rather the group is an ongoing and dynamic grouping of servers or services that match the criteria, such that servers or services are regularly added or dropped from the group in real time and on-the-fly (as the changes occur within the network).

So, suppose an administrator wants all servers that have Oracle® databases having less than 10% disk space remaining for use. The administrator provides search criteria to this effect and provides it to the self-organizing server and the group is self populated and automatically defined.

In another case, suppose that a managing administrator does not know which applications are susceptible to a given performance bottleneck, but the installing administrator does know. Here, the installing administrator made a note in the install log for the application, which was then reported to the self-organizing server. The managing administrator then does an unstructured query via the self-organizing server to find out any negative consequences to servers that the managing administrator does not even know about should the managing administrator notice a particular performance problem developing in his/her area of assignment.

Suppose further that an administrator wants all servers that have Apache® or IIS and that are not configured with a firewall. The administrator points this query at the self-organizing server and watches to see if any servers pop up that meet the criteria and then he/she can take the appropriate management action.

In still another case, suppose an administrator is trained in samba configuration. He/She is an expert at samba configuration to make it perform at its maximum given memory and processing power. He/She creates a group of all samba servers that have a high load. Any server that pops up in that group he/she can go to and proactively look at for purposes of improving its configuration or making himself/herself known to the local administrator for that server.

In fact, there are many more cases like this, and in each case, it is queries that can be made by simply browsing the self-organizing server for interesting items. This is similar to what individuals might do on Facebook® when looking for interesting new users and or combinations of users. There is no predefined knowledge that is needed at the self-organizing server or in some "uber-admin" that knows and understands all things. Management tools (resource managers) are used to browse the index of or search the self-organizing server so as to see who is up and what is going on and to dynamically create and organize groups of servers/services based on current conditions, rather than based on some predefined and hardcoded structure in a management tool.

Figure 3:
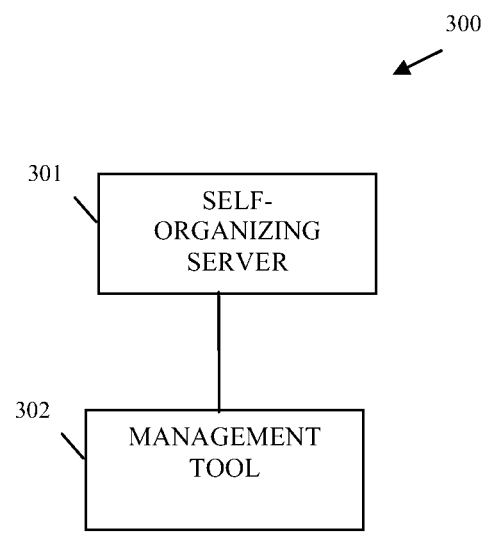
FIG. 3 is a diagram of spontaneous resource management system, according to an example embodiment.

FIG. 3 is a diagram of spontaneous resource management system 300, according to an example embodiment. The spontaneous resource management system 300 is implemented in a machine-accessible and computer-readable storage medium as instructions. The instructions when executed by a machine (computer or processor-enabled device) perform the processing depicted in the FIGS. 1 and 2. Moreover, the spontaneous resource management system 300 is operational over a network, and the network may be wired, wireless, or a combination of wired and wireless.

The spontaneous resource management system 300 includes a self-organizing server 301 and a management tool 302. Each of these and their interactions with one another will now be discussed in turn.

The self-organizing server 301 is implemented in a computer-readable storage medium as instructions that process on server machine (computer or processor-enabled device). Example processing associated with the self-organizing server 301 was presented above with reference to the method 100 of the FIG. 1.

The self-organizing server 301 collects information, which is associated with managed services or systems of an enterprise.

According to an embodiment, the self-organizing server 301 passively receives broadcast messages having the information. The broadcast messages are broadcast by each of the managed services over the network.

In another case, the self-organizing server 301 actively scrapes metadata from the managed services to gather some of the information.

The self-organizing server 301 indexes the information in a repository. Also, the self-organizing server 301 permits the management tool 302 to use a WWW search engine to formulate and execute the search.

The management tool 302 is implemented in a computer-readable storage medium as instructions that process on a client machine (computer or processor-enabled device) of a network administrator. Example processing associated with the management tool 302 was presented in detail above with reference to the method 200 of the FIG. 2.

The management tool 302 is used to search the information housed at the self-organizing server 301 for purposes of dynamically and selectively populating a managed group of the managed services or systems.

In an embodiment, the management tool 302 presents an interactive interface to a network administrator for purposes of defining the search and to select and define the managed group. The management tool 302 may permit a search to be defined or permit the search to be automatically built via browsing an index or hierarchy of information related to the managed services and maintained by the self-organizing server 301.

Figure 4:
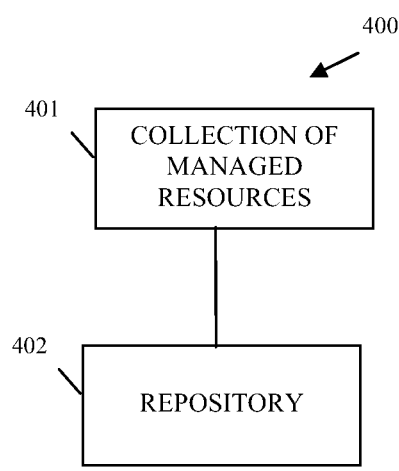
FIG. 4 is a diagram of another spontaneous resource management system according to an example embodiment.

FIG. 4 is a diagram of another spontaneous resource management system 400 according to an example embodiment. The spontaneous resource management system 400 is implemented as instructions on or within a machine-accessible and computer-readable storage medium. The instructions when executed by one or more machines (computer(s) or processor-enabled device(s)) perform various aspects of the processing depicted with respect to the methods 100 and 200 of the FIGS. 1 and 2, respectively; and the system 300 of the FIG. 3. The spontaneous resource management system 400 is also operational over a network and the network may be wired, wireless, or a combination of wired and wireless.

The spontaneous resource management system 400 includes a collection of managed resources 401 and a repository 402. Each of these components and their interactions with one another will now be discussed in turn.

Each resource of the collection of managed resources 401 is implemented in a computer-readable storage medium as instructions and is to be processed by a machine (computer or processor-enabled device) over the network. Example aspects of the collection of managed resources 401 were presented above in detail with reference to the methods 100 and 200 of the FIGS. 1 and 2, respectively, and with respect to the system 300 of the FIG. 3.

The collection of managed resources 401 is dynamically defined via a search that is formulated via a management tool, such as the management tool 302 of the system 300 and depicted in FIG. 3.

In an embodiment, the collection of managed resources 401 is dynamically modified by deleting a member or by adding a new member when conditions related to the search warrant modification to the collection of managed resources 401. In other words, when a member changes information such that it no longer conforms to the search that defines the collection of managed resources 401, then the collection of managed resources 401 is dynamically and in real time modified to remove that particular member. Similarly, the collection of managed resources 401 can be dynamically modified by adding a new member that adds information that conforms to the search.

The repository 402 is implemented in a computer-readable storage medium and is accessible to the managed resources and to other resources of the network. Some example aspects of the repository 402 were presented in detail above with reference to the methods 100 and 200 of the FIGS. 1 and 2, respectively, and with respect to the system 300 of the FIG. 3.

In an embodiment, reach of the managed resources publish or advertise information that is captured in the repository. The search matches the information in the repository. In some instances, the information is at least partially dynamically culled from each of the managed resources.

Also, the information for each of the managed resources is indexed within the repository and compared against search criteria when the search is executed.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
regularly receiving broadcast messages from managed services of an enterprise over a network;
indexing the broadcast messages in a repository; without changing the broadcast messages and each broadcast message indicating the standards to which it adheres and indicating what each managed service associated with a particular broadcast message is doing and what it is, what the each managed service is doing is indicated by what is loaded and processing on a particular device for that managed service; and
subsequently permitting additional information obtained for each managed service to be viewed as a blog, the additional information is related to each managed service and the additional information for selectively identifying particular ones of the managed service that form a managed group of services that a management tool dynamically manages as a logical entity, the managed services are one or more of: services, servers, proxies, and storage devices, and the additional information obtained by periodic searches of a repository that is a self-organizing server, the periodic searches dynamically alters membership in the managed group by adding new managed service and removing existing managed services permitting the membership to chaotically change based on dynamic conditions that change with each of the managed services and the membership is automatically updated when the dynamic conditions are evaluated and warrant addition or removal from the membership, each service dynamically self-populates itself to the particular groups and each of the service dynamically self adds and removes itself from the particular groups as circumstances warrant based on the evaluation of the conditions.

2. The method of claim 1, wherein regularly receiving further includes receiving the broadcast messages as part of heartbeat messages emanating from servers that process the managed services.

3. The method of claim 1, wherein regularly receiving further includes periodically performing queries against the managed services to acquire additional information for each of the managed services that is indexed within the repository with the broadcast messages and available to the search of the management tool.

4. The method of claim 3, wherein performing further includes inspecting install logs and comments located in headers and source code for the managed services when performing the queries.

5. The method of claim 1, wherein indexing further includes using a World-Wide Web (WWW) search engine to perform the indexing of the broadcast messages within the repository and wherein the management tool uses the search engine to subsequently perform the search.

6. The method of claim 1, wherein indexing further includes maintaining the repository as one or more of: a file, a set of files, a directory, a set of directories, a relational database, a set of relational databases organized as a data warehouse, a dynamically maintained document, a set of dynamically maintained documents, an object, a set of objects, an object oriented database, a set of object oriented databases, and a hybrid database.

7. The method of claim 1, wherein subsequently permitting further includes returning a relevancy rating for each particular managed service that is returned when the management tool performs the search against the repository, and wherein the management tool selectively picks each member of the managed group in response to that member's relevancy rating.

* * * * *

UNITED STATES PATENT AND TRADEMARK OFFICE
CERTIFICATE OF CORRECTION

PATENT NO. : 8,914,481 B2  
APPLICATION NO. : 12/258181  
DATED : December 16, 2014  
INVENTOR(S) : Isaacson et al.

Page 1 of 1

It is certified that error appears in the above-identified patent and that said Letters Patent is hereby corrected as shown below:

In the Claims

In column 9, line 37, in Claim 1, delete "repository;" and insert --repository,--, therefor In column 9, line 49, in Claim 1, delete "service" and insert --services--, therefor In column 10, line 6, in Claim 1, delete "service" and insert --services--, therefor In column 10, line 13, in Claim 1, delete "service" and insert --services--, therefor Signed and Sealed this  
Twenty-eighth Day of April, 2015

Michelle K. Lee  
*Director of the United States Patent and Trademark Office*